(12) United States Patent
Meyerowitz et al.

(10) Patent No.: US 11,099,778 B2
(45) Date of Patent: Aug. 24, 2021

(54) CONTROLLER COMMAND SCHEDULING IN A MEMORY SYSTEM TO INCREASE COMMAND BUS UTILIZATION

(71) Applicant: Micron Technology, Inc., Boise, ID (US)

(72) Inventors: Trevor Conrad Meyerowitz, Morgan Hill, CA (US); Dhawal Bavishi, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/058,694

(22) Filed: Aug. 8, 2018

(65) Prior Publication Data

US 2020/0050397 A1  Feb. 13, 2020

(51) Int. Cl.
*G06F 3/06* (2006.01)
*G06F 13/16* (2006.01)

(52) U.S. Cl.
CPC .......... *G06F 3/0659* (2013.01); *G06F 3/0656* (2013.01); *G06F 13/1642* (2013.01); *G06F 13/1673* (2013.01)

(58) Field of Classification Search
CPC .. G06F 12/0246; G06F 3/0659; G06F 3/0679; G06F 3/0613; G06F 3/0619
USPC ........................................ 710/5, 6
See application file for complete search history.

(56) References Cited

U.S. PATENT DOCUMENTS

| | | | | |
|---|---|---|---|---|
| 5,564,062 A | * | 10/1996 | Meaney | G06F 13/364 710/111 |
| 5,872,992 A | * | 2/1999 | Tietjen | G06F 13/4213 712/28 |
| 6,160,812 A | * | 12/2000 | Bauman | H04L 47/566 370/230 |
| 6,195,724 B1 | | 2/2001 | Stracovsky et al. | |
| 6,216,178 B1 | | 4/2001 | Stracovsky et al. | |
| 6,272,600 B1 | * | 8/2001 | Talbot | G06F 13/1631 711/140 |
| 6,393,534 B1 | * | 5/2002 | Chen | G06F 13/1631 711/158 |
| 6,490,635 B1 | * | 12/2002 | Holmes | G06F 3/0605 710/15 |
| 8,195,858 B1 | * | 6/2012 | Keil | G06F 12/0859 710/117 |

(Continued)

OTHER PUBLICATIONS

International Search Report and Written Opinion, PCT/US2019/043317, dated Nov. 7, 2019.

*Primary Examiner* — Faisal M Zaman
(74) *Attorney, Agent, or Firm* — Greenberg Traurig (57) ABSTRACT

A first command is scheduled on a command bus, where the first command requires use of a data bus resource at a first time period after scheduling the first command. Prior to the first time period, a second command is identified according to a scheduling policy. A determination is made whether scheduling the second command on the command bus will cause a conflict in usage of the at least one data bus resource. In response to determining that scheduling the second command will cause the conflict in usage, a third lower-priority command is identified for which scheduling on the command bus will not cause the conflict in usage. The third (Continued)

command is scheduled on the command bus prior to scheduling the second command, even though it has lower priority than the second command.

9 Claims, 6 Drawing Sheets

(56) References Cited

U.S. PATENT DOCUMENTS

| | | | |
|---|---|---|---|
| 8,321,618 B1 | 11/2012 | Keil et al. | |
| 8,601,205 B1* | 12/2013 | Menon | G11C 15/00 |
| | | | 711/105 |
| 8,995,455 B1* | 3/2015 | Dropps | H04L 49/901 |
| | | | 370/412 |
| 9,274,937 B2* | 3/2016 | Batwara | G06F 3/0608 |
| 10,114,589 B2* | 10/2018 | Ouyang | G11C 16/08 |
| 2003/0145146 A1* | 7/2003 | Posner | G06F 9/526 |
| | | | 710/200 |
| 2005/0041655 A1* | 2/2005 | Hughes | H04L 45/10 |
| | | | 370/389 |
| 2005/0091460 A1 | 4/2005 | Rotithor et al. | |
| 2005/0273536 A1* | 12/2005 | Mathewson | G06F 13/4059 |
| | | | 710/110 |
| 2010/0017561 A1* | 1/2010 | Yang | G06F 12/0246 |
| | | | 711/103 |
| 2010/0262979 A1* | 10/2010 | Borchers | G06F 9/544 |
| | | | 719/321 |
| 2010/0332861 A1* | 12/2010 | Allalouf | G06F 1/3203 |
| | | | 713/300 |
| 2012/0030396 A1* | 2/2012 | Zhu | G11C 8/18 |
| | | | 710/308 |
| 2013/0151782 A1* | 6/2013 | Liu | G06F 12/0831 |
| | | | 711/130 |
| 2014/0040550 A1* | 2/2014 | Nale | G06F 13/1668 |
| | | | 711/118 |
| 2014/0258620 A1* | 9/2014 | Nagarajan | G06F 12/0815 |
| | | | 711/120 |
| 2015/0149680 A1* | 5/2015 | Kanda | G06F 13/4027 |
| | | | 710/308 |
| 2016/0231949 A1 | 8/2016 | Chang | |
| 2016/0313914 A1* | 10/2016 | Koets | G11C 16/32 |
| 2017/0116154 A1* | 4/2017 | Palmer | G06F 9/54 |
| 2017/0352403 A1 | 12/2017 | Lee et al. | |
| 2017/0352406 A1* | 12/2017 | Querbach | G11C 11/40603 |
| 2017/0371804 A1* | 12/2017 | Li | G06F 12/08 |
| 2018/0088834 A1* | 3/2018 | Sundaram | G06F 12/0238 |
| 2018/0188988 A1* | 7/2018 | Jain | G06F 3/0673 |
| 2018/0329815 A1* | 11/2018 | Song | G06F 12/0246 |
| 2019/0004984 A1* | 1/2019 | Lee | G06F 13/126 |
| 2019/0129633 A1* | 5/2019 | Wang | G06F 3/0632 |

* cited by examiner

CONTROLLER COMMAND SCHEDULING IN A MEMORY SYSTEM TO INCREASE COMMAND BUS UTILIZATION

FIELD OF THE TECHNOLOGY

Embodiments of the disclosure relate generally to memory systems, and more specifically, relate to the scheduling of commands provided by a memory controller of a host system to a memory sub-system to increase command bus utilization.

BACKGROUND

A memory sub-system can be a storage system, such as a solid-state drive (SSD) or, a memory module, such as a non-volatile dual in-line memory module (NVDIMM), and can include one or more memory components that store data. The memory components can be, for example, non-volatile memory components and volatile memory components. In general, a host system can utilize a memory sub-system to store data at the memory components and to retrieve data from the memory components.

A standardized communication protocol allows the host system to communicate with the memory sub-system to store data and retrieve data.

For example, JEDEC (Joint Electron Device Engineering Council) Solid State Technology Association has proposed a "DDR5 NVDIMM-P Bus Protocol" for communications between a host system and an NVDIMM-P memory module. This protocol is described in detail by the JEDEC Committee Letter Ballot, Committee: JC-45.6, Committee Item Number 2261.13D, Subject: "Proposed DDR5 NVDIMM-P Bus Protocol", which is hereby incorporated by reference herein in its entirety.

BRIEF DESCRIPTION OF THE DRAWINGS

The present disclosure will be understood more fully from the detailed description given below and from the accompanying drawings of various embodiments of the disclosure.

DETAILED DESCRIPTION

At least some aspects of the present disclosure are directed to scheduling commands sent by a host system to a memory sub-system for better bus utilization by selectively changing command sequences in view of data bus usages. A memory sub-system is also hereinafter referred to as a "memory device". An example of a memory sub-system is a memory module that is connected to a central processing unit (CPU) via a memory bus, such as a dual in-line memory module (DIMM), a small outline DIMM (SO-DIMM), a non-volatile dual in-line memory module (NVDIMM), etc. Another example of a memory sub-system is a storage system, such as a solid-state drive (SSD). In some embodiments, the memory sub-system is a hybrid memory/storage sub-system that provides both memory functions and storage functions. In general, a host system can utilize a memory sub-system that includes one or more memory components. The host system can provide data to be stored at the memory sub-system and can request data to be retrieved from the memory sub-system.

In some computer systems, such as a host system and a memory sub-system connected using an NVDIMM-P bus, one communication channel is used to transmit commands to store data in, or retrieve data from the memory sub-system, and another communication channel is used to transmit the data associated with the commands. For example, an NVDIMM-P bus can include a command bus and a data bus; the host system sends commands over the command bus; and the data associated with the commands is transmitted over a data bus. Different commands generally have different bus usage patterns. When commands are scheduled on the command bus according to a predetermined policy that favors the transmission of commands of one type before the transmission of commands of another type, the command bus is not fully utilized at some instances due to potential conflicts in data bus usages.

At least some aspects of the present disclosure address the above and other deficiencies by considering alternative commands for transmission on the command bus in a time period in which the command bus would be otherwise idling due to conflict in the data bus usage if the commands were scheduled strictly according to the predetermined policy. Making exceptions to the policy by transmitting the alternative commands out of the order required by the policy can increase bus utilization and thus the overall performance of the host system in accessing the memory sub-system.

Figure 1:
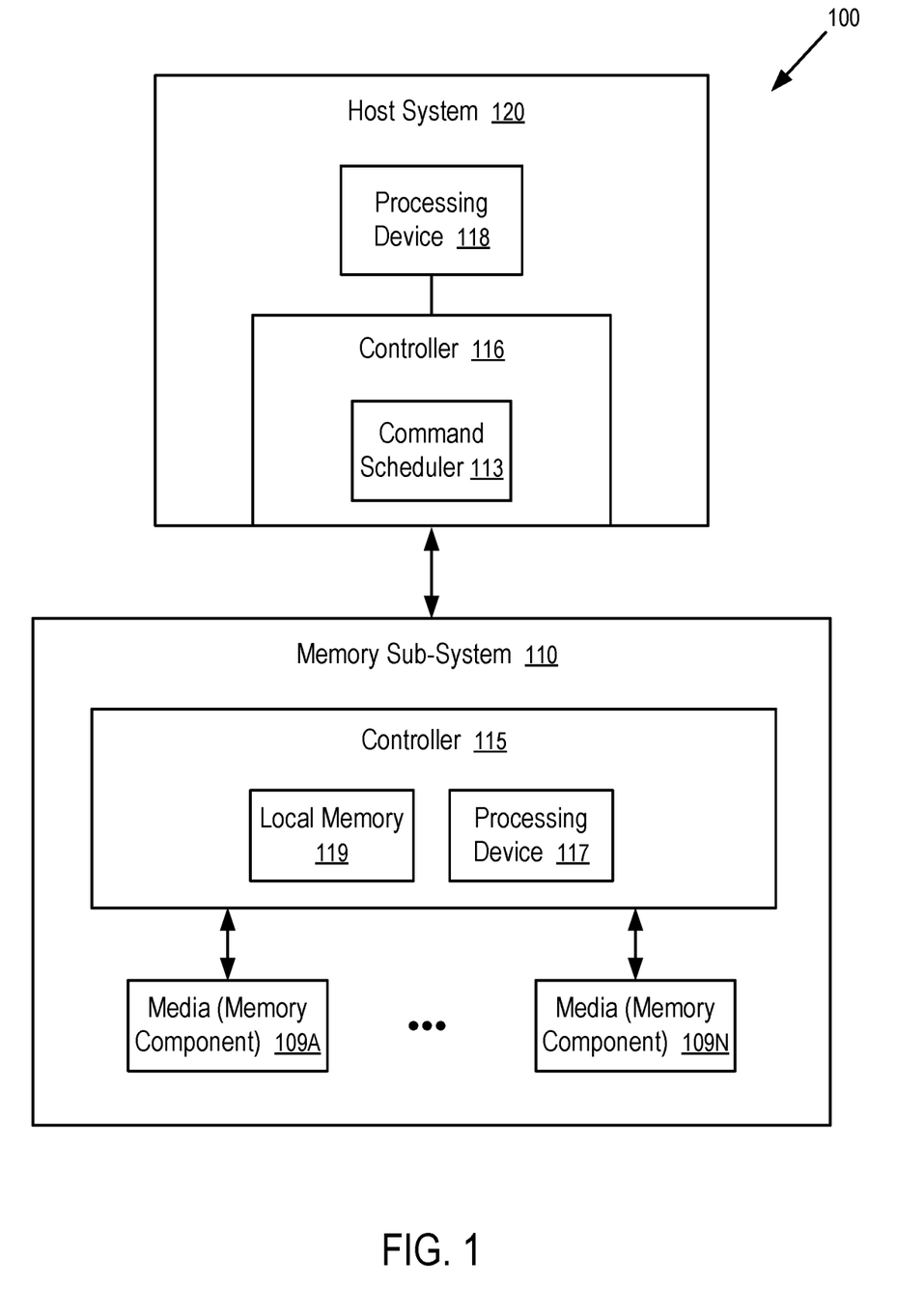
FIG. 1 illustrates an example computing system having a memory sub-system in accordance with some embodiments of the present disclosure.

FIG. 1 illustrates an example computing system 100 having a memory sub-system 110 in accordance with some embodiments of the present disclosure. The memory sub-system 110 can include media, such as memory components 109A to 109N. The memory components 109A to 109N can be volatile memory components, non-volatile memory components, or a combination of such. In some embodiments, the memory sub-system 110 is a memory module. Examples of a memory module includes a DIMM, NVDIMM, and NVDIMM-P. In some embodiments, the memory sub-system is a storage system. An example of a storage system is an SSD. In some embodiments, the memory sub-system 110 is a hybrid memory/storage sub-system. In general, the computing environment can include a host system 120 that uses the memory sub-system 110. For example, the host system 120 can write data to the memory sub-system 110 and read data from the memory sub-system 110.

The host system 120 can be a computing device such as a desktop computer, laptop computer, network server, mobile device, or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, etc. The physical host interface can be used to transmit data between the host system 120 and the memory sub-system 110. The host system 120 can further utilize an NVM Express (NVMe) interface to access the memory components 109A to 109N when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The host system 120 includes a processing device 118 and a controller 116. The processing device 118 of the host system 120 can be, for example, a microprocessor, a central processing unit (CPU), a processing core of a processor, an execution unit, etc. In some instances, the controller 116 can be referred to as a memory controller, a memory management unit, and/or an initiator. In one example, the controller 116 controls the communications over a bus coupled between the host system 120 and the memory sub-system 110.

In general, the controller 116 can send commands or requests to the memory sub-system 110 for desired access to memory components 109A to 109N. The controller 116 can further include interface circuitry to communicate with the memory sub-system 110. The interface circuitry can convert responses received from memory sub-system 110 into information for the host system 120.

The controller 116 of the host system 120 can communicate with controller 115 of the memory sub-system 110 to perform operations such as reading data, writing data, or erasing data at the memory components 109A to 109N and other such operations. In some instances, the controller 116 is integrated within the same package of the processing device 113. In other instances, the controller 116 is separate from the package of the processing device 118. The controller 116 and/or the processing device 118 can include hardware such as one or more integrated circuits and/or discrete components, a buffer memory, a cache memory, or a combination thereof. The controller 116 and/or the processing device 118 can be a microcontroller, special purpose logic circuitry (e.g., a field programmable gate array (FPGA), an application specific integrated circuit (ASIC), etc.), or another suitable processor.

The memory components 109A to 109N can include any combination of the different types of non-volatile memory components and/or volatile memory components. An example of non-volatile memory components includes a negative-and (NAND) type flash memory. Each of the memory components 109A to 109N can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and a MLC portion of memory cells. Each of the memory cells can store one or more bits of data (e.g., data blocks) used by the host system 120. Although non-volatile memory components such as NAND type flash memory are described, the memory components 109A to 109N can be based on any other type of memory such as a volatile memory. In some embodiments, the memory components 109A to 109N can be, but are not limited to, random access memory (RAM), read-only memory (ROM), dynamic random access memory (DRAM), synchronous dynamic random access memory (SDRAM), phase change memory (PCM), magneto random access memory (MRAM), Spin Transfer Torque (STT)-MRAM, ferroelectric random-access memory (FeTRAM), ferroelectric RAM (FeRAM), conductive bridging RAM (CBRAM), resistive random access memory (RRAM), oxide based RRAM (OxRAM), negative-or (NOR) flash memory, electrically erasable programmable read-only memory (EEPROM), nanowire-based non-volatile memory, memory that incorporates memristor technology, and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components 109A to 109N can be grouped as memory pages or data blocks that can refer to a unit of the memory component used to store data.

The controller 115 of the memory sub-system 110 can communicate with the memory components 109A to 109N to perform operations such as reading data, writing data, or erasing data at the memory components 109A to 109N and other such operations (e.g., in response to commands scheduled on a command bus by controller 116). The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or another suitable processor. The controller 115 can include a processing device 117 (processor) configured to execute instructions stored in local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the controller 115, in another embodiment of the present disclosure, a memory sub-system 110 may not include a controller 115, and can instead rely upon external control (e.g., provided by an external host, or by a processor or controller separate from the memory sub-system).

In general, the controller 115 can receive commands or operations from the host system 120 and can convert the commands or operations into instructions or appropriate commands to achieve the desired access to the memory components 109A to 109N. The controller 115 can be responsible for other operations such as wear leveling operations, garbage collection operations, error detection and error-correcting code (ECC) operations, encryption operations, caching operations, and address translations between a logical block address and a physical block address that are associated with the memory components 109A to 109N. The controller 115 can further include host interface circuitry to communicate with the host system 120 via the physical host interface. The host interface circuitry can convert the commands received from the host system into command instructions to access the memory components 109A to 109N as well as convert responses associated with the memory components 109A to 109N into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory components 109A to 109N.

The controller 116 includes a command scheduler 113 that can perform scheduling of commands in a way that maximizes the usage of the communication channel between the host system 120 and the 116. In some embodiments, the controller 116 includes at least a portion of the command scheduler 113. For example, the controller 116 can include logic circuitry implementing the command scheduler 113. In some embodiments, the command scheduler 111 is implemented as least in part via execute instructions in a processing device, such as in the processing device 118. The instructions can be part of a device driver, an operating system, and/or an application of the host system 120. In some embodiments, a combination of software/firmware and logic circuitry can be used.

The command scheduler 113 can schedule commands by considering alternative commands for transmission on the command bus in a time period in which the command bus would be otherwise idling due to conflict in the data bus usage if the commands were scheduled strictly according to the predetermined policy. Further details with regards to the operations of the command scheduler 113 are described below.

Figure 2:
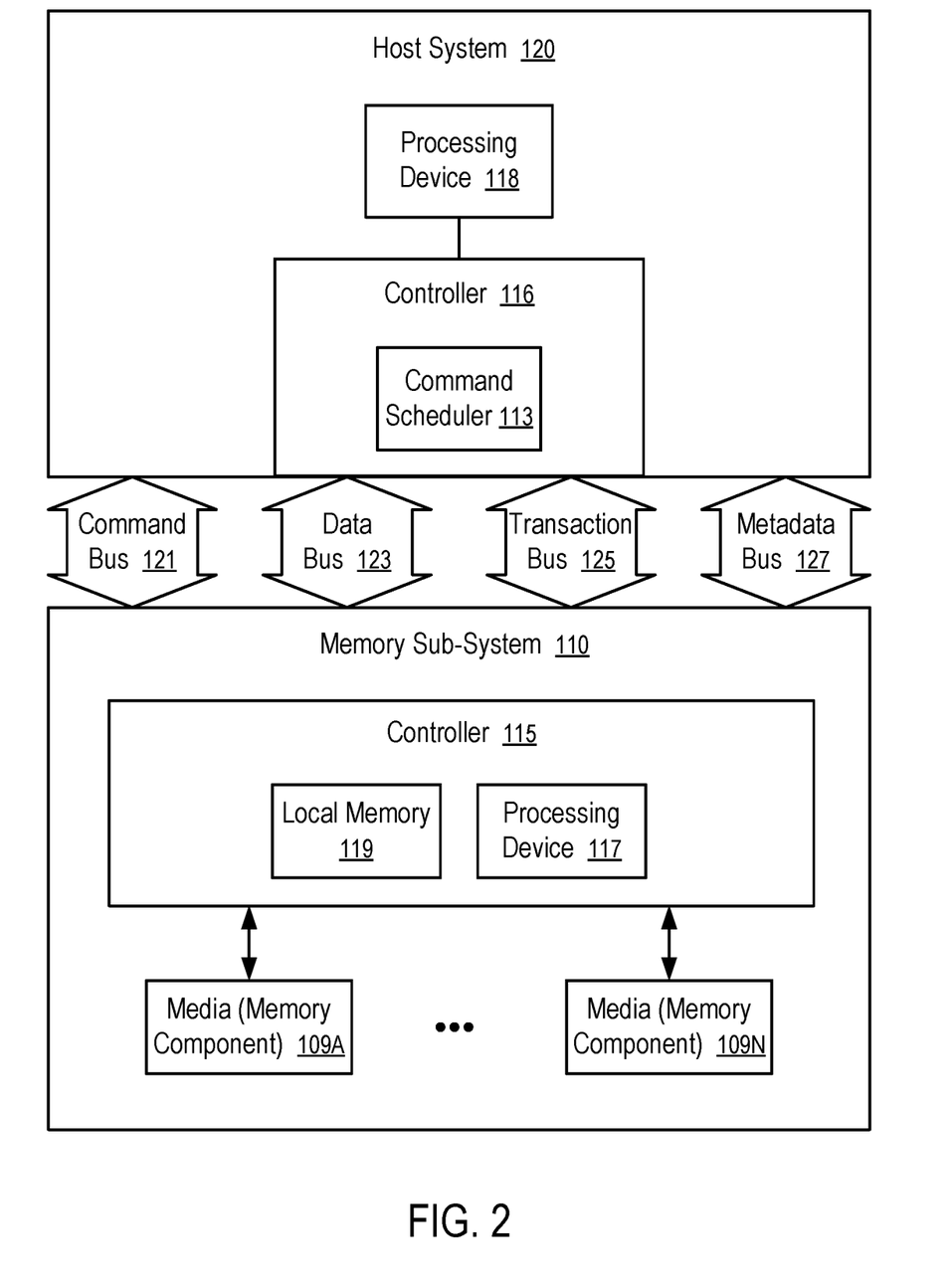
FIG. 2 illustrates an example computing system that includes a command scheduler to schedule commands on a command bus in accordance with some embodiments of the present disclosure.

FIG. 2 illustrates an example computing system that includes a command scheduler 113 to schedule commands on a command bus 121 in accordance with some embodiments of the present disclosure.

Merely for non-limiting purposes of illustration in describing FIG. 2, the controller 116 of the host system 120 is sometimes referred to below as memory controller 116, and the controller 115 of the memory sub-system 110 is sometimes referred to below as media controller 115.

In FIG. 2, the communication channel between the host system 120 and the memory sub-system 110 includes the command bus 121, a data bus 123, a transaction bus 125, and a metadata bus 127. A communication protocol for the communication channel allows asynchronous access to the memory sub-system 110 for data storage and retrieval by the host system 120. For example, the memory sub-system 110 can be an NVDIMM; and the host system 120 can access the memory controller 116 in accordance with a JEDEC NVDIMM-P Bus Protocol using the command bus 121, the data bus 123, the transaction bus 125, and the metadata bus 127.

For example, the memory controller 116 can issue a write command to store data in the memory sub-system 110. After a fixed and predetermined time window from the transmission of the write command on the command bus 121, the memory controller 116 starts transmitting the data on the data bus 123. The memory sub-system 110 is not required to complete the operations of the write command within a predetermined time period. Examples of such a write command include XWRITE and PWRITE identified in the JEDEC NVDIMM-P Bus Protocol.

For example, the memory controller 116 can issue a read command to request information from the memory sub-system 110. The memory sub-system 110 is not required to generate a response within a predetermined time window from the read command. Examples of such a read command include XREAD and SREAD identified in the JEDEC NVDIMM-P Bus Protocol. An XREAD can be given a predetermined read ID to indicate that it is an information request (status_read) that will return system state, but won't access the media directly.

In response to the read command, the memory sub-system 110 prepares data that is requested by the read command. For example, the media controller 115 can retrieve data from media (e.g., 109A, . . . , or 109N) and buffer the retrieve data in the local memory 119 or another memory such that the data can be successfully transmitted to the memory controller 116 within a predetermined time window when such a transmission is requested.

When the requested data is ready for transmission, the memory sub-system 110 can provide a response signal in the transaction bus 125. When the memory controller 116 is informed of the readiness of the memory sub-system 110 to transmit certain data, the memory controller 116 can provide a send command to request the memory sub-system 110 to start transmitting data on the data bus 123 within a predetermined time window from the send command. When responding to the send command, the memory sub-system 115 can also send transaction status information, such as read ID identifying the corresponding read command, write credit information as further discussed below, metadata corresponding to the transaction, and/or error correction code (ECC). An example of such a send command is SEND identified in the JEDEC NVDIMM-P Bus Protocol.

The memory sub-system 110 can buffer read commands and write commands received from the command bus 121 in the local memory 119 or another memory. The media controller 115 can execute the buffered commands in an order different from the order in which the commands are received.

The memory sub-system 110 has a certain amount of capacity for buffering pending read commands and write commands and their associated data. The memory controller 116 and the media controller 115 can communicate with each other to prevent buffer overflow in the memory sub-system 110.

For example, a write credit can be used to represent a unit of buffer capacity that is available for buffering a write command and its associated data of a predetermined size. In some instances, a write command can have data larger than the predetermined size; and such a write command requires multiple write credits for buffering the command and its data in the memory sub-system 110.

The memory controller 116 can maintain a count of write credits it can use to transmit write commands on the command bus 121 to the memory sub-system 110. When a write command is sent over the command bus 121, the memory controller 116 deducts the write credits used by the write command. To avoid buffer overflow, the memory controller 116 should not transmit a write command when the memory controller 11 does not have sufficient write credits for transmitting the write command to the memory sub-system 110.

The media controller 115 can maintain a count of write credits it can return to the memory controller 116 for completed write commands. After a write command buffered in the memory sub-system 110 is completed, the buffer space used by the write command can be freed to accept further write commands from the memory controller 116. The write credits used by the write command that has been completed can be added to the count of write credits that can be returned to the memory controller 116.

The memory sub-system 110 can use the metadata bus 127 to specify the number of write credits it is returning to the memory controller 116. For example, after sending a response signal on the transaction bus 125 to enable the memory controller 116 to issue a send command, the media controller 115 can transmit the number of returned write credits using the metadata bus 127. The memory sub-system 110 can transmit such a response signal in response to a read command, such as XREAD and SREAD identified in the JEDEC NVDIMM-P Bus Protocol. An example of the response signal is RSPx_n identified in the JEDEC NVDIMM-P Bus Protocol.

When the memory controller 116 uses a read command to request retrieval of data from an address, the memory controller 116 can place an address command immediately following the read command to specify the address. Similarly, when the memory controller 116 uses a write command to store data at an address, the memory controller 116 can place an address command immediately following the write command to specify the address. An example of such an address command is XADR identified in the JEDEC NVDIMM-P Bus Protocol.

Figure 3:
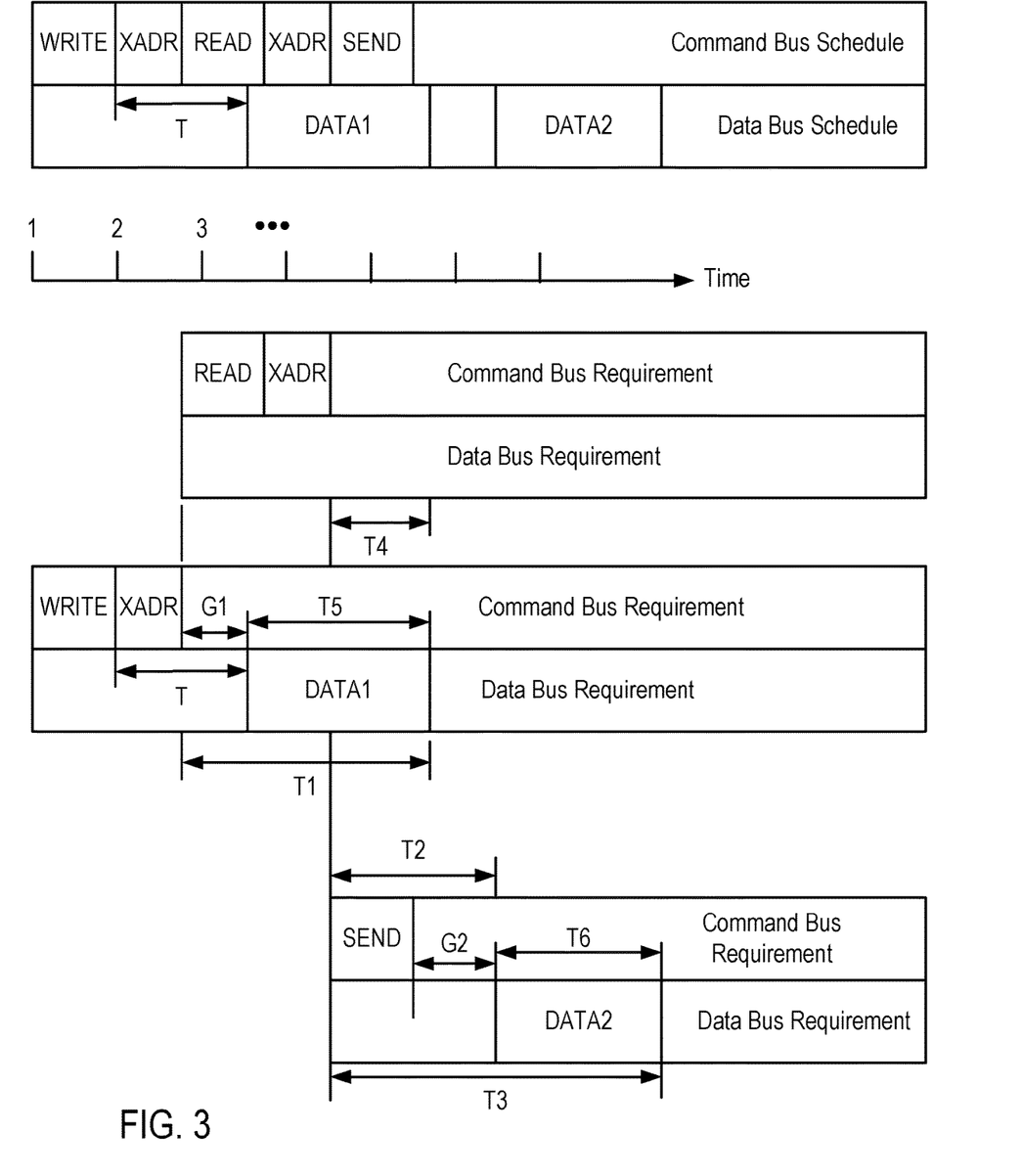
FIG. 3 illustrates example command bus and data bus requirements for command scheduling in accordance with some embodiments of the present disclosure.

FIG. 3 illustrates example command bus and data bus requirements for command scheduling in accordance with some embodiments of the present disclosure.

In the example illustrated in FIG. 3, a WRITE command is scheduled or being transmitted on the command bus 121. The transmission of the command WRITE requires the immediate use of the data bus 123 after a period of time T following the transmission of the WRITE command. For example, after the transmission of the XADR command for the WRITE command, the data bus 123 is used after a fixed gap G1 (e.g., according to a fixed time period TSEND_WR identified in the JEDEC NVDIMM-P Bus Protocol). Scheduling another write command, or a send command, immediately following the XADR command of the WRITE command may have a conflict in the data bus usage.

For example, the WRITE command illustrated in FIG. 3 requires the use of the data bus 123 for a time period T5. Thus, the data bus 123 is not available to be used for another command for the duration of T5. The SEND command illustrated in FIG. 3 requires the use of the data bus 123 exactly after a time period T2 from the transmission of the SEND command, following a fixed gap G2 (e.g., in accordance with TSEND_RD identified in the JEDEC NVDIMM-P Bus Protocol).

When the WRITE command is scheduled on the command bus 121, T1>T2, and T3>G1, the SEND command cannot follow immediately after the transmission of the XADR command of the WRITE command, due to the conflict in the timing of the data bus usages by the WRITE command and SEND command. To avoid the conflict in using the data bus 123, the SEND command is to be scheduled at least a time period of T1−T2 after the XADR command of the WRITE command.

However, the READ command illustrated in FIG. 3 does not have a data bus conflict with the WRITE command. Thus, the READ command can be transmitted immediately following the XADR command of the WRITE command. After the transmission of the READ command and its associated XADR command, the time period to when the data bus 123 becomes available is reduced to T4. When T4<T2, the SEND command can be transmitted on the command bus immediately following the XADR command of the READ command. Thus, the scheduling illustrated in FIG. 3 more fully utilizes the command bus.

In general, any alternative command that does not have a conflict in the use of the data bus 123 during the time period T5 can be scheduled immediately following the XADR command of the WRITE command. Similarly, after the SEND command is scheduled, any command that does not have a conflict in the use of the data bus 123 during the time period T6 for the SEND command can be scheduled immediately following the SEND command. Since a READ command does not use data bus 123, the READ command does not have a conflict with any WRITE or SEND command. Thus, the READ command can always be scheduled after a WRITE or SEND command, when other high priority commands cannot be scheduled after the WRITE or SEND command without leaving the command bus 121 idling for a period of time.

According to the present disclosure, the command bus utilization is improved by evaluating write and send commands available for scheduling using one or more data schedulers, and only considering the commands for scheduling if the commands schedule on the data bus 123 at that moment (e.g., without causing a data bus usage conflict and without leaving the command bus 121 idling). For example, when a policy favors SEND commands over READ commands, but it is determined that there is presently a data bus resource block for a read command, command scheduler 113 can select and issue a read command instead. For example, the selected read command is a command that would otherwise be scheduled after the send command that is currently being blocked. This approach can be similarly used in a case in which a policy favors write commands over read commands.

In other cases, instead of scheduling the READ command above, an unselected send command can be selected for scheduling if a data bus conflict will not occur. Alternatively, an unselected write command can be selected for scheduling if a data bus conflict will not occur.

In one example of command scheduling by memory controller 116, a first command is scheduled on the command bus 121 at a time instance, which requires the use of the data bus 123 (and/or other data bus resources in general) at a predetermined time period following the first command. Before reaching this predetermined time period, a second command is identified according to a predetermined policy (which is implemented without checking for a data bus conflict). A determination is made whether putting the second command on the command bus 121 at a clock cycle following the first command will cause a data bus conflict (e.g., in data bus usage for data being transferred).

If there is a data bus conflict, scheduling of the second command on the command bus 121 is delayed. Instead, the predetermined policy is suspended and a third command is identified that has a different and compatible data bus usage pattern, or doesn't use the data bus. If the third command can be scheduled and will use (or not use) the data bus 123 without a conflict, the third command is scheduled prior to the second command.

If no command can be scheduled at the current clock cycle in a way that avoids a data bus conflict, then the command bus 121 is permitted to idle for the current cycle. Then, on the next cycle, the above operations of evaluating the second and third commands (and fourth commands) for data bus conflict can be repeated.

In another example, after a write or send command is selected as a potential candidate for scheduling (according to a predetermined policy such as described for the example above), the command scheduler 113 determines when the candidate command can be scheduled based on whether there will be a conflict in usage of data bus resources (as determined at least in part based on input from one or more of the data schedulers). If it is determined that a conflict exists, then the candidate command is delayed to a later time to avoid the conflict. If delaying the candidate command opens a time window larger than a threshold in the command bus schedule sufficient for sending another command that does not have a timing conflict in data bus usage (e.g., a read command), the no-conflict command is sent before the transmission of the candidate command.

In one embodiment, when evaluating potential candidate commands for scheduling on the command bus 121, the timing for the next write command and the timing for the next send command can each separately be determined using data schedulers based on checking for any data bus conflicts associated with the respective command.

The data scheduler can be, for example, logic circuitry of the memory controller 116 and/or a software process executing on the processing device 118. For example, two logic circuits (each used as a data scheduler) can be used for evaluating timings of next write and send commands, respectively. In one example, the command scheduler 113 receives inputs from the data scheduler(s) and selects one of three next candidate commands (e.g., READ, WRITE, or SEND) for scheduling to improve utilization of the command bus 121 (and in some cases additionally the data bus 123), as illustrated in FIG. 4.

In one embodiment, prior to scheduling a command, command scheduler 113 makes a determination whether hazards exist for which data is to be read by a potential candidate read command, but for which that same data (or a portion thereof) has not yet been written to memory sub-system 110 by a pending write command. In one example, command scheduler 113 determines an address location or address range associated with the data to be read and determines if the address location or address range associated with the pending write command creates a hazard. In one embodiment, all such hazards associated with pending commands are resolved by command scheduler 113 prior to scheduling the commands on command bus 121.

Figure 4:
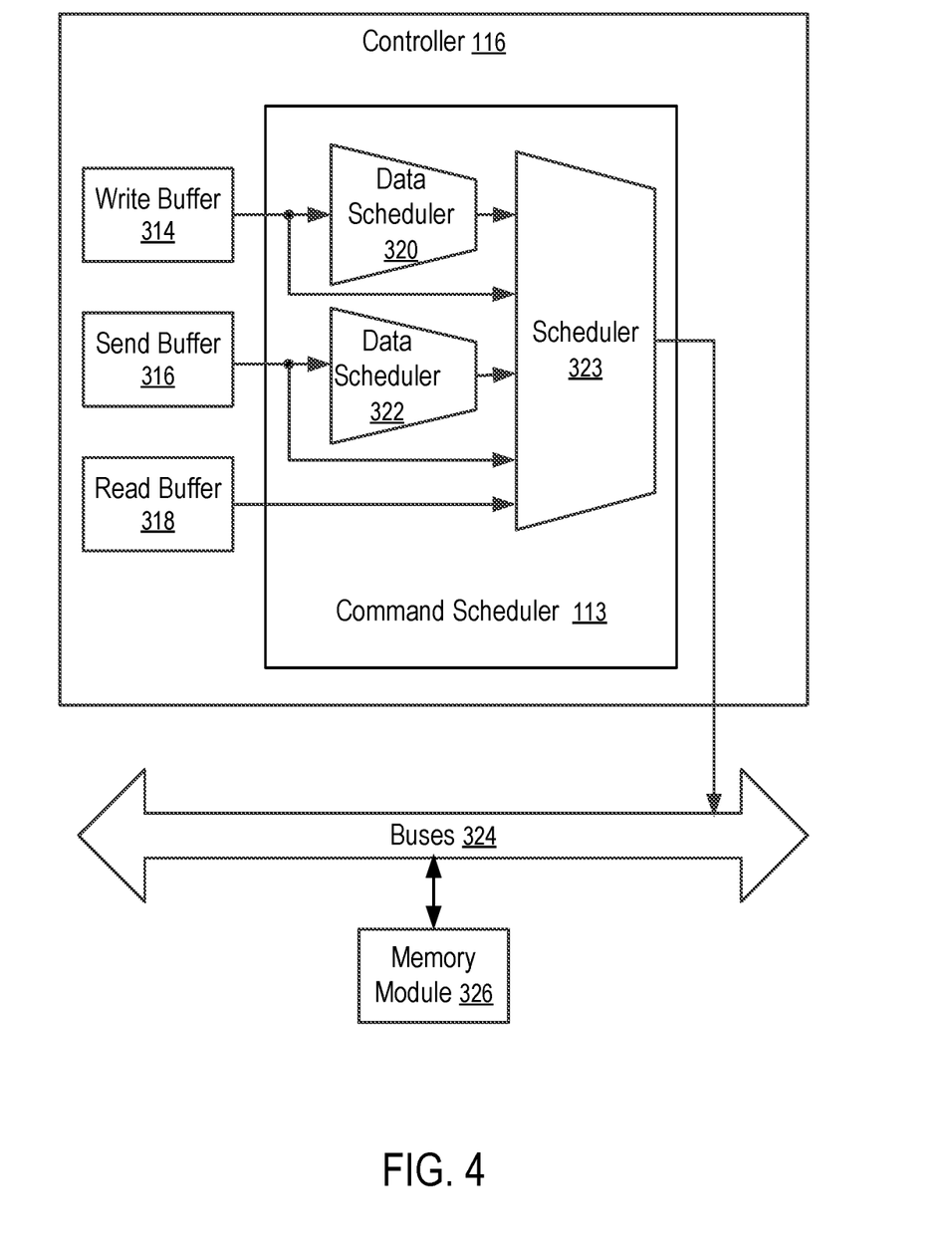
FIG. 4 illustrates an example computing system that includes a controller with a command scheduler in accordance with some embodiments of the present disclosure.

FIG. 4 illustrates an example computing system that includes a controller 116 with a command scheduler 113 in accordance with some embodiments of the present disclosure. FIG. 4 illustrates the memory controller 116 communicates with a memory module 326 using buses 324. For example, the memory module 326 can be the memory sub-system 110 in FIG. 1 or 2; and the buses 324 can include the command bus 121, data bus 123, transaction bus 125, and/or metadata bus 127. The memory controller 116 illustrated in FIG. 4 can be used to implement the controller 116 of host system 120 in FIG. 1 or 2. In one example, the memory module 326 is an NVDIMM-P; and the communications on the buses 324 are in accordance with the JEDEC NVDIMM-P Bus Protocol.

In one embodiment, data is transmitted between memory controller 116 and the memory module 326 through the buses. The memory controller 116 includes a write buffer 314, a send buffer 316, and a read buffer 318. The write buffer 314 has a queue of write commands to be transmitted to the memory module 326; the send buffer 316 has a queue of send commands to be transmitted to the memory module 326; and the read buffer 318 has queue of read commands to be transmitted to the memory module 326.

The command scheduler 113 can schedule transmission of commands on the buses 324 based on a scheduling policy. To fully utilize the buses 324, the command scheduler 113 can make exceptions to the scheduling policy based on timing inputs from a write data scheduler 320 and a send data scheduler 322.

In one embodiment, a write command can be queued in the write buffer 314 for transmission; and data bus usage associated with the write command is scheduled by the write data scheduler 320. The write data bus scheduler 320 provides to the scheduler 323 with an indication of when the write command can be transmitted on the buses 324 based on when the data of the write command can be transmitted.

Also, a send command can be queued in the send buffer 316 for transmission; and data bus usage associated with the send transaction is scheduled by the send data scheduler 322. The send data bus scheduler 322 provides to the scheduler 323 with an indication of when the send command can be transmitted on the buses 324 based on when the data of the send command can be transmitted.

Further, a read command can be queue in the read buffer 318 for transmission. The read command does not use data bus; and thus, no data scheduler is needed for the read command.

The scheduler 323 uses the scheduling policy and knowledge of the inputs from the write data bus scheduler 320 and the send data bus scheduler 322 to more efficiently schedule transmission of commands over the buses 324. The scheduler 323 has visibility into both command and data scheduling requirements and can modify the order of commands to make exceptions to the scheduling policy to fully utilize the buses 324.

Figure 5:
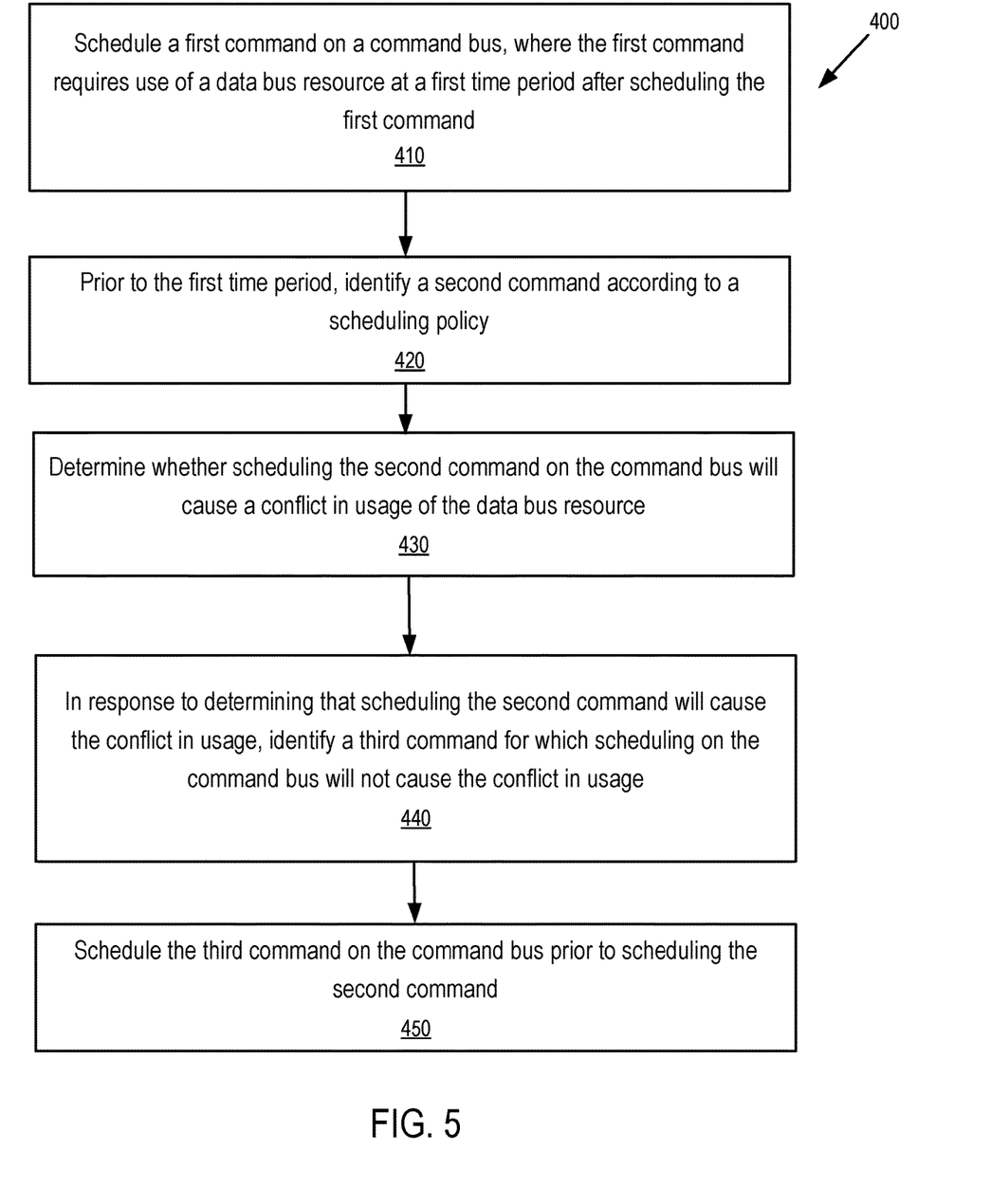
FIG. 5 is a flow diagram of an example method to schedule commands in accordance with some embodiments of the present disclosure.

FIG. 5 is a flow diagram of an example method 400 to schedule commands, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the command scheduler 113 of FIG. 1 or 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 410, the command scheduler 113 schedules a first command on a command bus (e.g., command bus 121) that requires use of at least one data bus resource at a first time period after scheduling the first command. For example, the first command can be associated with a send or write operation that transfers data using a data bus (e.g., data bus 123).

At block 420, prior to the first time period, the command scheduler 113 identifies a second command according to a scheduling policy.

At block 430, the command scheduler 113 determines whether scheduling the second command on the command bus 121 will cause a conflict in usage of the data bus resource (e.g., without placing the command bus 121 in an idling state, or in an idling state for a time period longer a threshold). For example, the command scheduler 113 makes this determination based at least in part on inputs from write data scheduler 320 and/or send data scheduler 322. In another example, one of pending commands is selected from the write buffer 314 or the send buffer according to a scheduling policy; a data scheduler can be used to generate an input for the selected command; and the command scheduler 113 makes this determination based on the input from the data scheduler.

At block 440, in response to determining that scheduling the second command will cause a conflict in usage of the at least one data bus resource (and/or idling of the command bus 121), a third command is identified for which scheduling on the command bus will not cause the conflict in usage of the data bus resource (and/or reduce an idle time period of the command bus 121).

At block 450, the commander scheduler 113 schedules the third command on the command bus 121 prior to scheduling the second command. For example, the third command is a read command, and command scheduler 113 schedules the read command prior to the second command (e.g., a write command or a send command, while the scheduling policy favors write command and/or send commands over read commands).

Figure 6:
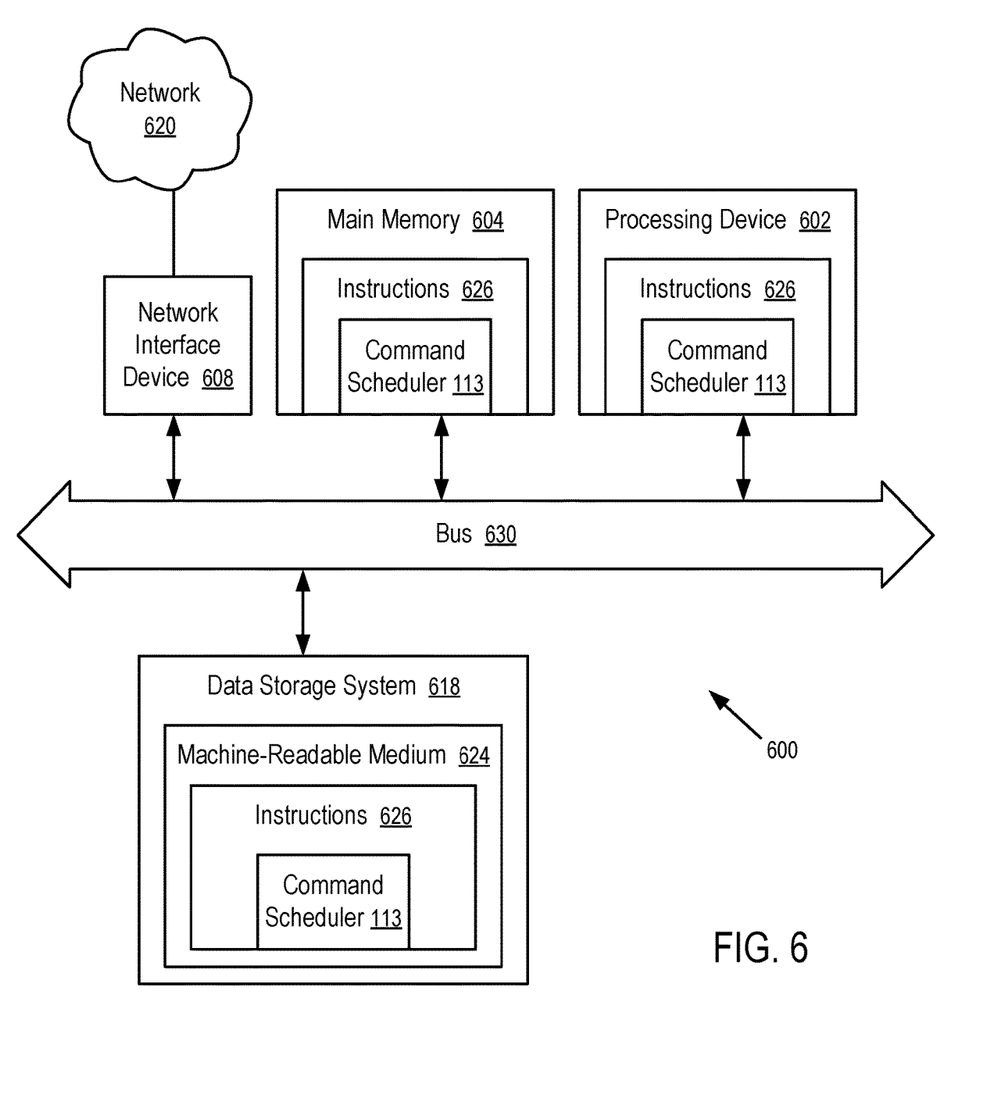
FIG. 6 is a block diagram of an example computer system in which embodiments of the present disclosure can operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the command scheduler 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), static random access memory (SRAM), etc.), and a data storage system 618, which communicate with each other via a bus 630 (which can include multiple buses).

Processing device 602 represents one or more general-purpose processing devices such as a microprocessor, a central processing unit (CPU), or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), a graphics processing unit (GPU), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to a command scheduler that performs data aware command scheduling (e.g., command scheduling by the command scheduler 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A host system, comprising:
   at least one memory; and
   a processing device, operatively coupled with the at least one memory, configured to:
   schedule, by a command scheduler of the host system, a first write command on a command bus, wherein the command bus transmits commands from the host system to a controller of a memory system, the command scheduler schedules commands on the command bus, the first write command requires use of a data bus at a first time period after scheduling the first write command, and the data bus is used to transfer first data associated with the first write command from the host system to the memory system;
   schedule an address command immediately following the first write command, wherein the address command specifies an address for the first data;
   prior to the first time period, identify, by the command scheduler, a second write command according to a scheduling policy that favors scheduling of write commands over read commands, wherein the data bus is used to transfer second data associated with the second write command from the host system to the memory system;
   determine, by the command scheduler, whether scheduling the second write command on the command bus immediately following the address command will cause a conflict in usage of the data bus for transferring the first data and the second data on the data bus;
   in response to determining that scheduling the second write command will cause the conflict in usage of the data bus, identify, by the command scheduler, a read command for which scheduling on the command bus will not cause the conflict in usage of the data bus; and
   schedule, by the command scheduler, the read command on the command bus immediately following the address command and prior to scheduling the second write command.

2. The system of claim 1, wherein the read command is used to read third data, and the processing device is further configured to:
   determine an address range associated with storing the second data; and
   prior to scheduling the read command, determine that the third data is not stored within the address range.

3. The system of claim 1, wherein the scheduling policy further favors scheduling of send commands over read commands.

4. The system of claim 1, wherein the memory system is a memory module comprising non-volatile memory.

5. The system of claim 1, wherein the second write command is in a queue pending scheduling by the command scheduler of the host system.

6. A method comprising:
   queuing, by a memory controller of a host system, commands associated with transfer of data using a data bus, wherein the data bus is used to transfer data between the memory controller and a memory system in accordance with write commands, wherein the memory controller has a predetermined scheduling policy for scheduling commands on a command bus, wherein the predetermined scheduling policy favors scheduling of write commands over read commands;
   determining that the data bus is not available for performing a first data transfer associated with a second write command due to a conflict in usage of the data bus associated with a previously-scheduled first write command, wherein an address command is scheduled immediately following the first write command, and the address command specifies an address for data to be written by execution of the first write command; and
   in response to determining that the data bus is not available for performing the first data transfer, scheduling a read command on the command bus immediately following the address command and prior to scheduling the write command.

7. The method of claim 6, wherein scheduling the read command prior to scheduling the write command is an exception to the predetermined scheduling policy.

8. A non-transitory computer-readable storage medium storing instructions that, when executed by a processing device of a host system, cause the processing device to:
- queue commands associated with transfer of data using a data bus, wherein the commands include a first write command, a second write command, and a read command each to be scheduled on a command bus, wherein the command bus transmits commands from the host system to a memory system, wherein the data bus is used to transfer data associated with the first write command and the second write command from the host system to the memory system, and wherein the read command does not use the data bus;
- schedule the first write command, wherein first data associated with the first write command is transferred on the data bus;
- schedule an address command immediately following the first write command, wherein the address command specifies an address for the first data;
- after scheduling the first write command, identify the second write command according to a scheduling policy that favors scheduling of write commands over read commands;
- determine an availability of the data bus for performing a data transfer for the second write command, wherein second data associated with the second write command is transferred on the data bus;
- determine that scheduling the second write command immediately following the address command according to the scheduling policy will cause a conflict on the data bus for transferring the first data and the second data;
- in response to determining that scheduling the second write command will cause the conflict, schedule the read command immediately following the address command; and
- schedule the second write command after the read command.

9. The non-transitory computer-readable storage medium of claim 8, wherein scheduling the second write command after the read command is an exception to the scheduling policy.

* * * * *